Jan. 29, 1952  S. B. WILLIAMS ET AL  2,583,759
WEATHER SHIELD
Filed Feb. 27, 1950
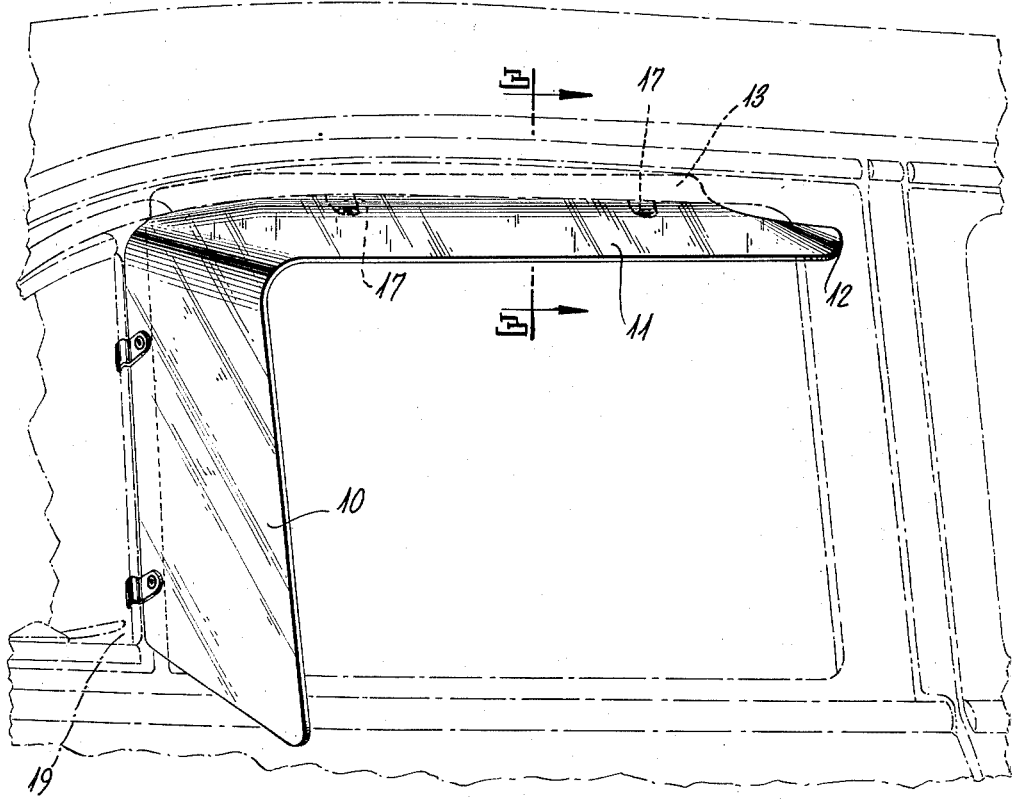
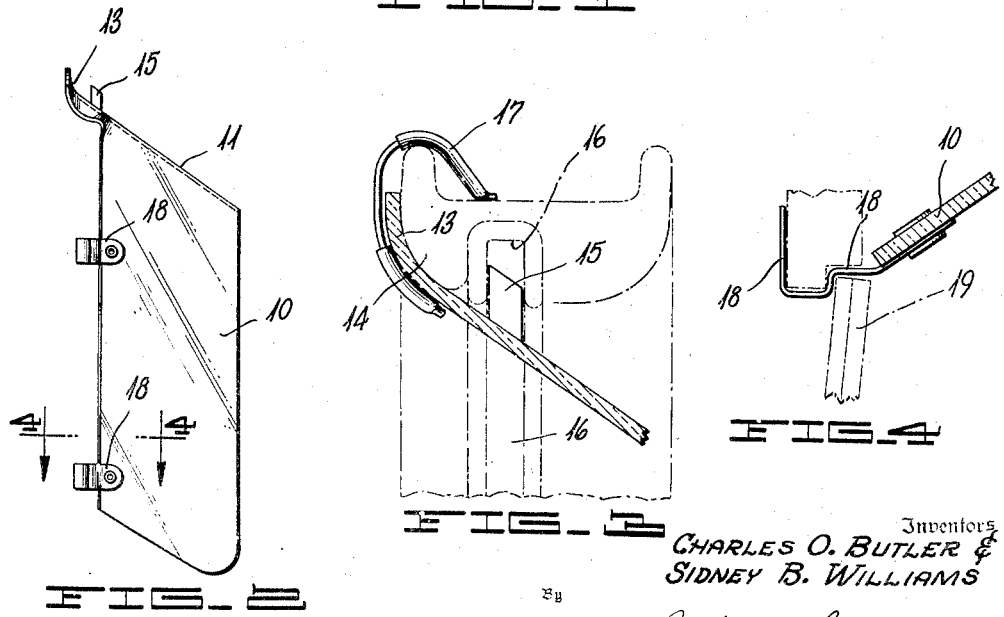
Inventors
CHARLES O. BUTLER &
SIDNEY B. WILLIAMS
Naylor and Lassagne
Attorneys Patented Jan. 29, 1952

2,583,759

UNITED STATES PATENT OFFICE 2,583,759

WEATHER SHIELD

Sidney B. Williams and Charles O. Butler, Oakland, Calif., assignors to C & S All Weather Shield Co., Oakland, Calif., a copartnership Application February 27, 1950, Serial No. 146,566

3 Claims. (Cl. 296—44)

The present invention relates to weather shields for the window openings of motor propelled vehicles and more specifically to a rain and wind shield forming an easily attached and detached accessory designed to fit the window openings of automobiles and trucks of the constructions now in common use.

The principal object of the invention is to provide effective means for deflecting wind and rain from an automobile window opening by providing shielding means designed to prevent both horizontal and descending currents of wind and rain from entering the window opening, particularly during travel, and still permit use of the fully opened window for arm signals, etc.

Other objects are to provide shielding means of the nature stated which will be applicable to conventional automobile window openings without structural alteration of the window frame and which can readily be attached or mounted thereon, or dismounted, without requiring the use of tools or special skill.

The foregoing, as well as other advantages apparent from the specific description to follow, are achieved by providing an L-shaped shield designed for attachment to the upper margin and forward dividing post of the casing or frame of an automobile window. The shape provides horizontal and vertical wings and these are disposed in such manner as to shed rain and deflect air currents. Also, the manner of mounting the shield is such as to create no obstruction to the raising and lowering movement of the window pane nor to substantially complete an effective closing of the window when desired. Full understanding of a construction embodying the invention will be obtained from the following detailed description in connection with the accompanying drawing, where:

Figure 1 is a perspective view of the shield as it appears when mounted in the window opening of an automobile door, shown in broken lines together with adjacent parts;

Figure 2 is a view of the detached shield as viewed from the front, with the shield in the position it assumes when mounted;

Figure 3 is a transverse sectional view, on an enlarged scale, taken on line 3—3 of Figure 1; and Figure 4 is a similar view taken on line 4—4 of Figure 2.

In the embodiment of the invention herein disclosed, the shield consists of an elongated strip of transparent sheet material, preferably some six to eight inches wide, shaped to form angularly related wing portions 10 and 11 of lengths such as to cause the inner margin of the shield to occupy substantially the full extent of the upper margin and forward dividing post of an automobile window frame, as illustrated in Figure 1. The shield is so shaped as to cause the wings 10 and 11 to lie in converging planes which intersect at substantially right angles thus giving the wings the proper degree of inclination or pitch to assure shedding of rain. The rear edge of the horizontal wing 11 is preferably formed with a tapering up-turned portion or lip 12 beginning at the outer corner of the wing and designed to prevent flow of water over that edge.

As means for mounting the shield in position on the window opening, the wing 11 is formed with an upwardly curved extension web 13, shaped to fit the rounded inner side of the window frame member, as at 14, Figure 3, and is also provided with a fixed upright positioning lug 15, on its upper side near its rear end designed for interlocking fit within the window glass receiving slot 16 in the upper side of the window frame. Rubber covered spring clips 17, shaped to hook over the upper edge of the door frame and fit over the curved outer surface of the wing extension 13, preferably are used to clamp the horizontal wing 11 of the shield to the upper side of the window frame. The inner edge of the vertical wing 10 is provided with one or more hook shaped brackets 18 fixed thereto and designed to fit over the abutment strip on the post separating the main window opening from the opening of the swivel wing window, shown in broken lines at 19.

To mount the shield, it is preferably passed through the window opening from the inside, with the wing window 19 open, and the brackets 18 placed over the window post. The shield is then moved up to bring the lug 15 into the slot 16 and the curved extension 13 against the inner side of the window frame to a snug fit. The spring clips 17, usually two, are then placed in position with proper spacing between them after which the swivel wing window is closed firmly against the forwardly disposed surfaces of the brackets 18. This gives a secure mounting for the shield and permits it to be installed in a minimum of time.

It has been found desirable to make the shield of either clear or suitably tinted transparent plastic material of suitable thickness and strength. The plastic sheet material marketed as "Plexiglas" has been found to possess the desired qualities. However, it will be obvious that any suitable material or combination of materials could be employed to produce a shield embodying the gist of the invention.

The construction and arrangement of weather shield disclosed affords efficient protection for an open automobile window without obstructing the driver's view or interfering with arm signals and permits driving with an open window with full protection against falling rain. However, the window can be effectively closed when desired by raising the glass until its upper edge contacts the mounting web 13.

What is claimed is:

1. The combination with a motor vehicle window, having a main window opening, a forward swivel window, and a dividing post between said windows formed with an abutment for the swivel window; of a weather shield composed of transparent sheet material and comprising a vertically disposed wing coextensive with said post and secured thereto by spaced clips conforming to the wing window abutment thereon, said clips being locked in position by closure of the wing window thereagainst, said shield having a horizontally disposed wing forming a continuation of its vertical wing and extending along the full length of the upper edge of the main window opening, the vertical and horizontal wings being inclined outwardly on converging planes intersecting at substantially right angles whereby to deflect air away from the main window opening during travel.

2. The combination with a motor vehicle window having a main window opening, a forward swivel window, and a dividing post between said windows formed with an abutment for the swivel window; of a weather shield comprising two connected wings of transparent sheet material of unequal length disposed in substantially right angled relation, the shorter wing being coextensive with the dividing post and carrying spaced clips conforming to the wing window abutment and adapted to be locked thereto by closure of the swivel window, the longer wing being substantially co-extensive with the upper edge of the main window opening and provided with spaced projections on its inner edge having interlocking engagement with said upper edge, said wings being inclined outwardly on converging planes intersecting at substantially right angles and the rear outer corner of the longer wing being formed as an upwardly curved deflecting lip, whereby the inclined wings and lip cooperate to deflect wind and rain away from the main window opening during travel.

3. The combination with a motor vehicle window having a main window opening, a forward swivel window, and a dividing post between said windows formed with an abutment for the swivel window; of a weather shield composed of transparent sheet material and comprising a vertically disposed wing coextensive with said post and secured thereto, said shield having a horizontally disposed wing forming a continuation of its vertical wing and extending along the full length of the upper edge of the main window opening, the vertical and horizontal wings being inclined outwardly on converging planes intersecting at substantially right angles whereby to deflect air away from the main window opening during travel.

SIDNEY B. WILLIAMS.
CHARLES O. BUTLER.

REFERENCES CITED

The following references are of record in the file of this patent:

UNITED STATES PATENTS

| Number | Name | Date |
|---|---|---|
| D. 102,974 | Pritchard | Jan. 26, 1937 |
| 2,059,924 | Woina | Nov. 3, 1936 |
| 2,199,134 | Johnson | Apr. 30, 1940 |
| 2,468,439 | Gregorius | Apr. 26, 1949 |
| 2,500,991 | Kent | Mar. 21, 1950 |
| 2,519,446 | Elsebusch | Aug. 22, 1950 |

OTHER REFERENCES

Auto Ventshade Side Visors, "Motor" (periodical), November 1949, volume No. 92, issue No. 5, page 115.